United States Patent
Holmberg (12) 
(10) Patent No.: US 6,311,289 B1
(45) Date of Patent: Oct. 30, 2001

(54) EXPLICIT STATE COPY IN A FAULT TOLERANT SYSTEM USING A REMOTE WRITE OPERATION

(75) Inventor: Per Holmberg, Stockholm (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 09/185,474

(22) Filed: Nov. 3, 1998

(51) Int. Cl.⁷ .................................................. G06F 11/20
(52) U.S. Cl. .............................. 714/6; 714/10; 709/200; 700/2
(58) Field of Search ................................. 714/7, 12, 10, 714/2, 11, 6; 709/200, 400; 713/1, 100; 700/82, 2, 79; 711/100, 147, 154; 710/52

(56) References Cited

U.S. PATENT DOCUMENTS

| | | |
|---|---|---|
| 3,864,670 | 2/1975 | Inoue et al. . |
| 5,469,503 | 11/1995 | Butensky et al. . |
| 5,579,220 | 11/1996 | Barthel . |
| 5,953,742 | * 9/1999 | Williams . |
| 6,073,251 | * 6/2000 | Jewett et al. . |

FOREIGN PATENT DOCUMENTS

| | | |
|---|---|---|
| 0 752 656 | 1/1997 | (EP) . |
| 2 217 487 | 10/1988 | (GB) . |

* cited by examiner

*Primary Examiner*—Gopal C. Ray
(74) *Attorney, Agent, or Firm*—Burns, Doane, Swecker & Mathis, L.L.P.

(57) ABSTRACT

The present invention provides a new method for performing re-integration of a CPU in a fault tolerant computer system. One of a "remote write" operation and a copy mode is used to copy the contents of the microprogram memory (control memory), all registers and all memories from a current CPU to a faulty CPU. Through the use of special purpose registers this method advantageously simplifies the logic design of the two processors compared to conventional fault tolerant systems with re-integration capabilities. Transfer of re-integration data is efficiently controlled by software in the current CPU so that data which would otherwise be overwritten in the faulty CPU is not transferred. This reduces the required bandwidth and simplifies the mechanical and electrical design of the update bus connected between the two CPU's. This update system provides register to register transfers which results in fast re-integration, which directly translates into decreased down time for the system and thus, increased overall system performance compared to conventional systems.

25 Claims, 11 Drawing Sheets

EXPLICIT STATE COPY IN A FAULT TOLERANT SYSTEM USING A REMOTE WRITE OPERATION

BACKGROUND

This invention relates generally to fault tolerant computer systems and more particularly to redundant processor computer systems used in support of telephone systems.

Modem telephone systems handle large volumes of time critical information on a routine basis. In such systems fault tolerance is a high priority and the need exists for a redundant processor system. APZ is an example of a computer system in which both processors execute in lockstep. Tandem Integrity is an example of a triple redundancy processor system. In fault tolerant systems there are at least two Central Processing Units (CPU's) that run in parallel where one of the two CPU's is always in an Executive (EX) state and the other is in a Stand By (SB) state. Both CPU's run the same microcode and execute the same instructions. The difference between the EX CPU and the SB CPU, as the two processors will be referred to, is that the only CPU whose output is actually used by the system it supports is that of the EX CPU. Of course, as is normal in fault tolerant systems, if the EX CPU should ever fail, or otherwise be taken out of operation, the output connections would be immediately switched to the SB CPU. In this manner the SB CPU could take over the processing chores of the system at any time, thus making the system fault tolerant. Examples of well known CPU's include the X86 family, Pentium and Pentium II CPU's manufactured by the Intel Corporation.

At this point a simple distinction should be drawn between a basic fault tolerant system and a basic multiprocessor system. In general, multiprocessor systems use more than one processor to work on different parts of the same job. Usually, in multiprocessor systems, there is one "manager" processor that divides up the job into smaller tasks and assigns the tasks to the other processors in the multiprocessor system. The managing processor may then begin a task itself or oversee the entire job trying to optimize the system's performance by insuring all of the processors in the system are processing an equal amount of work. Load sharing is a term often used to describe the type of work done by basic multiprocessor systems. In contrast, a basic fault tolerant system does not divide up the work load. Instead, each processor in a fault tolerant system does the entire job so that more than one processor is performing the same job. The same instructions and data are processed by each of the processors in a basic fault tolerant system. In this way, if one processor fails at any time another processor can take its place and take over the processing chore for the failed procesor. A multiprocessor system would have faster results on a large problem than a fault tolerant system, but, if one of the processors in each of the above system failed, the fault tolerant system would be the only one to complete the job without user intervention.

There are many reasons why one of the processors in a fault tolerant system may be temporarily taken out of operation. Maintenance activities, such as repair of a faulty board or upgrading of the operating system, may force temporary "down time". Detection and subsequent correction of a fault or error are examples of other circumstances that may cause a processor in a dual processor system to be temporarily taken "off line". The terms CPU and processor are well known equivalents in the art and will be used interchangeably in this document. No matter what the reason, after either one of the processors has been off line, it will no longer be in synchronization with the processor which remained on line. Synchronization in this context refers to timing and also to having identical data in each processor. The areas of concern, in regards to the data in each processor are the internal registers and main memory. Main memory, or just memory, refers to the random access memory or RAM associated with each CPU. Main memory may be divided into more than one portion, with each portion having defined addressing limits. Also, each CPU may have more than one "main" memory, in which case each memory would be given a different name to avoid confusion and addressing limits would not be a concern. The state of a CPU is defined by the contents of the internal registers, or hardware registers, of the CPU. It will be understood that, although the state of a CPU may include small memories such as caches and tables which may be used for branch prediction and linking purposes, the contents of register memory is generally accepted as defining the state of a CPU.

Prior to a restart, the processor which was taken off line, or faulty processor as it will be referred to, must be updated with the state of the processor which remained on line, or current processor. In other words, the contents of the current processor's internal registers must be loaded into the internal registers of the faulty processor. The memory of the faulty processor also needs to be loaded with the data in the memory of the current processor. This entire process is called updating or re-integration.

The challenge involved in re-integration is to complete the process in as little time as possible. Time is of the essence in the re-integration process because both CPU's must be involved in the re-integration process. Therefore, system application execution is temporarily stopped. As a result, overall system throughput is reduced. In dual-processor operations, degradation of system performance is directly proportional to the length of time required for re-integration. It is therefore important to provide a method by which a processor in a dual processor system may be updated in as little time as possible.

Figure 1:
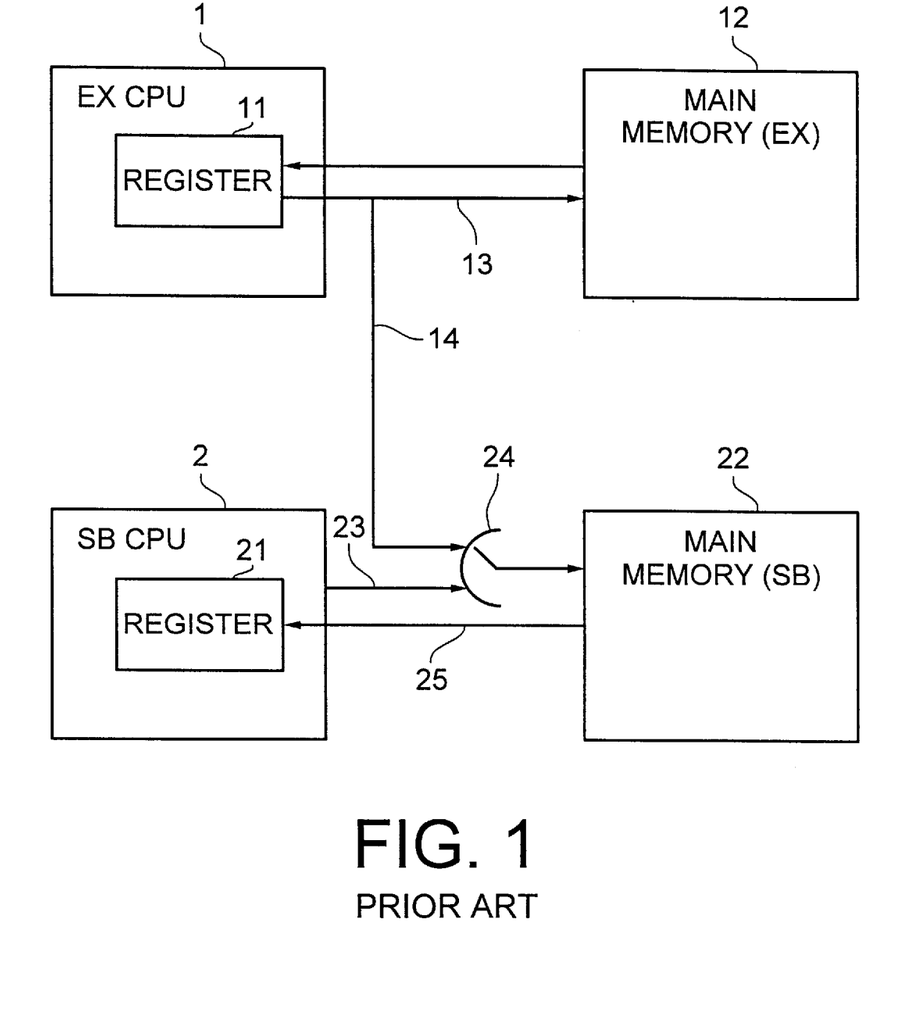
FIG. 1 is a block diagram of prior art showing the copy main memory method of re-integration.

Two known methods of doing re-integration in dual processor computers can be referred to as "copy main memory" and "copy instruction execution results". In copy main memory, which is illustrated in FIG. 1, the contents of main memory (EX) 12 are copied to the main memory (SB) 22 of the SB CPU 2. The state of the EX CPU 1, which is held in registers 11, is then copied to both main memory (EX) 12 and main memory (SB) 22. Synchronous restart is initiated reading the data formerly held in registers 11 into both CPU's in parallel. This method is used, for example, in the IMP and Tandem Integrity fault tolerant systems. The drawback with this method is that it is slow because main memory, which may be an order of magnitude slower than registers, is intimately involved. Further, transfer of the state of the EX CPU 1 requires two main memory operations, a write and a read, since the contents of the internal registers must first be transferred to memory before they can be transferred to the SB CPU 2. The result is a long stop of application execution, which as mentioned above, degrades system performance.

Figure 2:
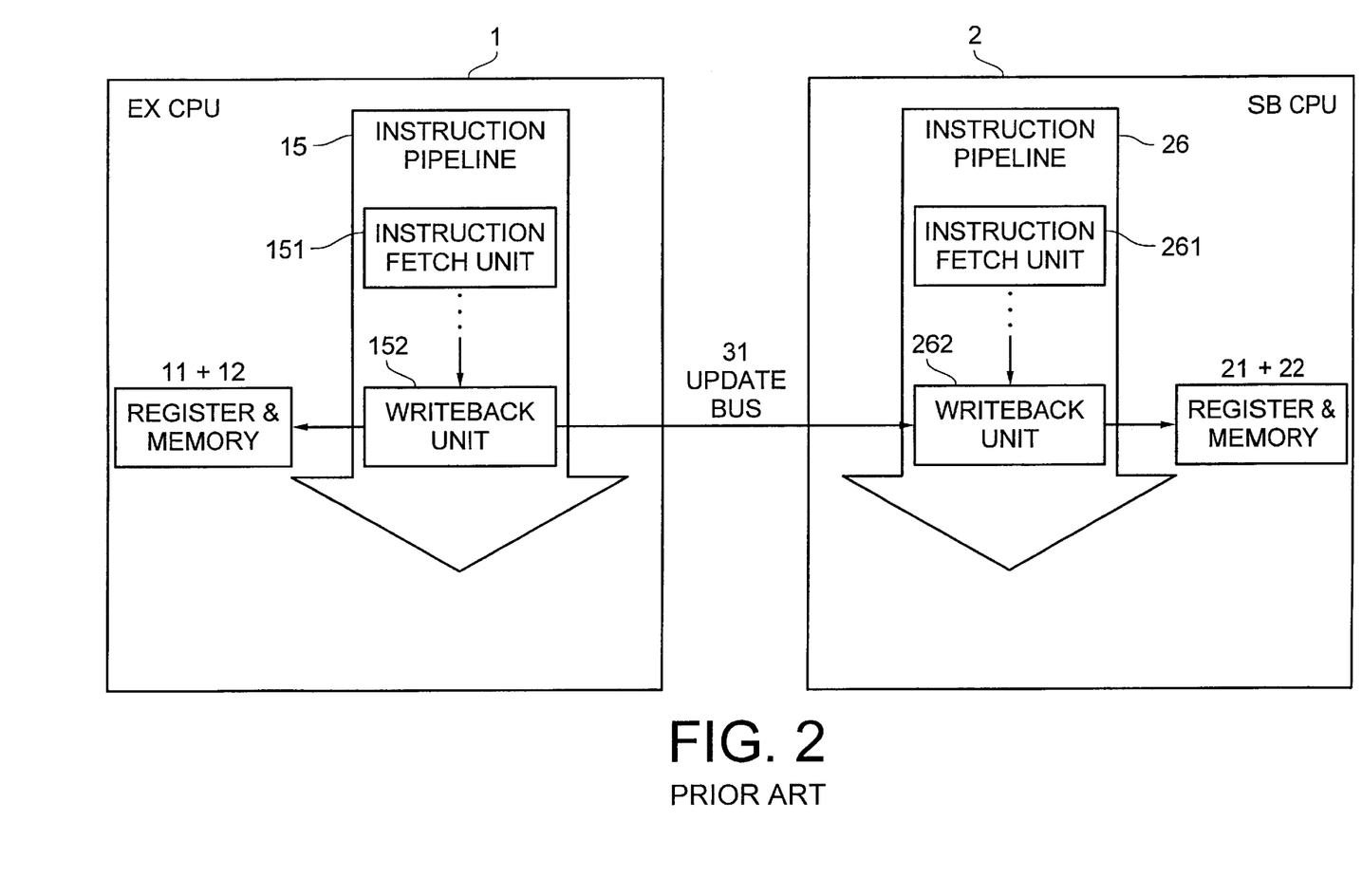
FIG. 2 illustrates the prior art method of copy instruction execution results.

FIG. 2 illustrates the second known re-integration method, copy instruction execution results. This method copies the results of all instructions that execute in the EX CPU 1 to the SB CPU 2. In this figure, EX CPU 1 is the current processor and SB CPU 2 is the faulty processor. Instruction pipelines 15 and 26 represent the basic functions performed in each CPU, respectively. Stages of a typical pipelined processor include: fetch, decode, execute, memory access and writeback. Writeback unit 152 of the current CPU transfers the results of each executed instruction over update bus 31 to writeback unit 262 of the faulty CPU. Data from the registers and main memory of EX CPU 1 are also transferred through the writeback units of each processor. This method requires extra hardware in the writeback unit of each processor in order to transfer all of the required data.

In the copy instruction execution results method, the microinstruction execution unit in the faulty CPU receives only an address to its control memory from the current CPU. Consequently, the microprogram in both CPU's must be the same. This means that the faulty CPU is forced to follow the current CPU regardless of the contents in the faulty CPU's control memory. Typically a microprogram is stored in a read only memory, also known as a control store, of a computer. Microprograms control the manner in which the hardware of a CPU reacts to the instructions of an application that are executed in the instruction pipeline of the CPU.

Figure 3:
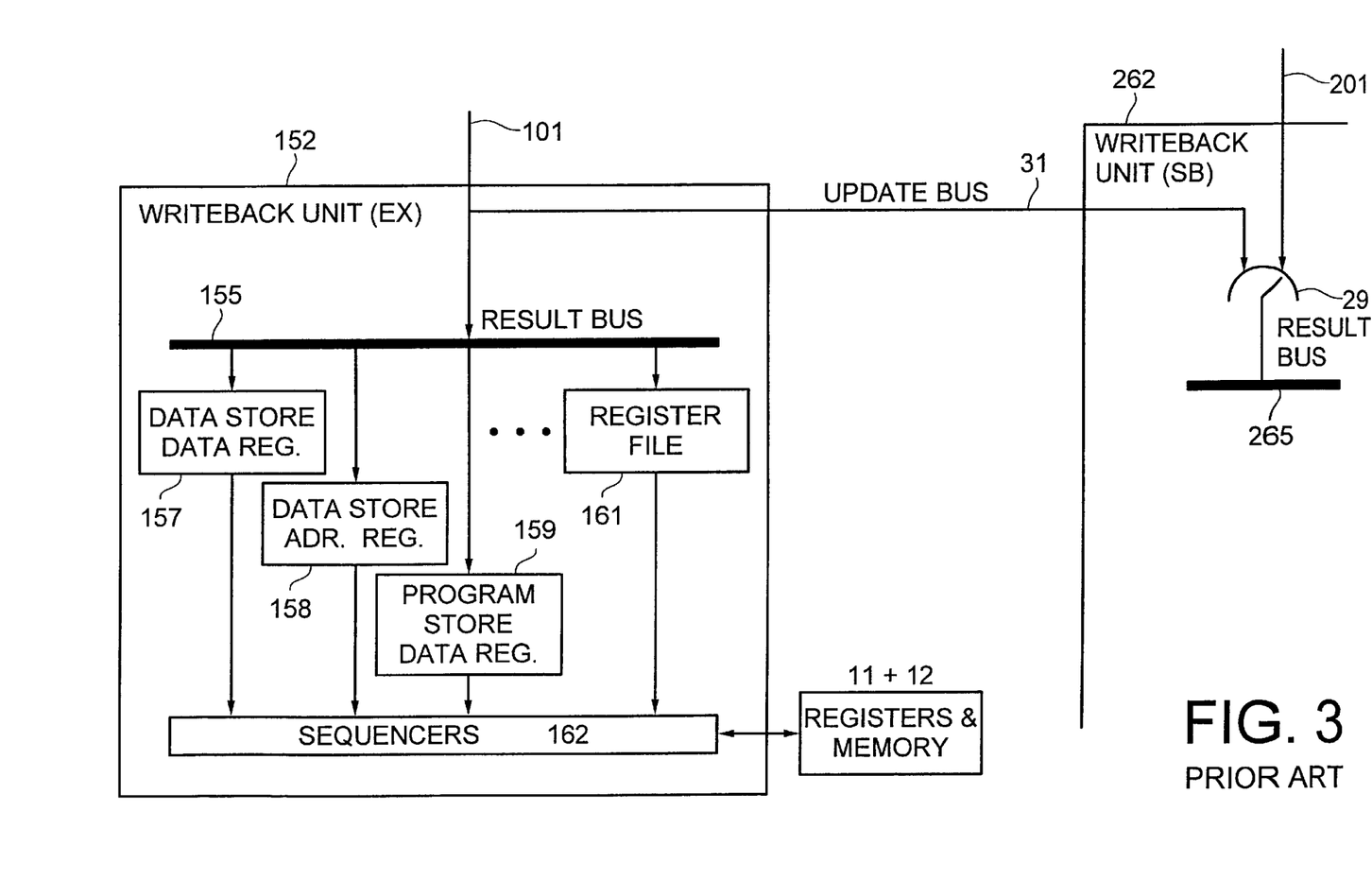
FIG. 3 is a detailed illustration of the prior art method of copy instruction execution results.

A more detailed view of the instruction execution method can be seen in FIG. 3, which shows results bus 265 of the faulty CPU can receive data from one of two sources. During a re-integration operation, result bus 265 receives data from instruction path 101 of the current CPU, through update bus 31 and MUX 29. During normal operations, result bus 265 receives data from instruction path 201 of its own CPU. Re-integration of the two CPU's is signaled to begin when the working state of the faulty CPU is changed from Stand By/Halt (SB/HA) to Stand By/Update (SB/UP). The processors are said to be in the working state SB/UP when the result bus 265 in the faulty CPU is receiving data from the instruction path 101 of the current CPU over update bus 31. APZ212-20 is an example of a dual-processor system that uses the copy instruction execution results method.

The drawback with this system is that a large volume of temporary information is copied to the faulty CPU. As a result, most of the information copied to the faulty CPU will be overwritten by new information almost immediately. To support this large volume of information that must be transferred the bandwidth of update bus 31 must be made equally large. Thus, requiring extra traces on a printed circuit board and extra pins on each CPU. This leads to complicated electrical and mechanical designs of systems which use this method of re-integration.

SUMMARY

The present invention provides a new method for performing re-integration of a CPU in a fault tolerant computer system. One of a "remote write" operation and a copy mode is used to copy the contents of the microprogram memory (control memory), all registers and all memories from a current CPU to a faulty CPU. Through the use of special purpose registers this method advantageously simplifies the logic design of the two processors compared to conventional fault tolerant systems with re-integration capabilities. Transfer of re-integration data is efficiently controlled by software in the current CPU so that data which would otherwise be overwritten in the faulty CPU is not transferred. This reduces the required bandwidth and simplifies the mechanical and electrical design of the update bus connected between the two CPU's. This update system provides register to register transfers which results in fast re-integration, which directly translates into decreased down time for the system and thus, increased overall system performance compared to conventional systems.

According to one aspect of the present invention, a method of re-integrating a first processor and at least one second processor in a fault tolerant system is provided in which the first and second processors each include registers and at least one memory. A requirement for re-integration is detected and re-integration information is transferred from the first processor to the second processor by messages, while the first processor is in at least one of a copy mode and a remote write operation. The transfer has a plurality of phases, including at least one phase for register information and at least one phase for memory information, and the re-integration information can originate from at least one of the registers and memory.

In other aspects, the method may include the step of accessing, in the first processor, an address mapping of all registers and memory locations in the second processor, flow control of re-integration messages may be performed by an interface in each of the first and second processors, and re-integration information may be transferred via at least one register in the first processor and at least one register in the second processor. The copy mode may be enabled by writing to a mode register to place the first processor in a copy memory writes mode, and changing the operation of a sequencer so that the sequencer copies all writes to a specified memory in the first processor to a corresponding specified memory in the second processor, after the mode register is written to. If the remote write operation is enabled, the control memory and/or the state of the first processor is transferred to the second processor.

According to another aspect of the present invention an apparatus for re-integrating a first processor and at least one second processor in a fault tolerant processor system is provided in which the first and second processors each include registers and at least one memory. A detector in the first processor initiates re-integration upon detection that re-integration is required. Re-integration information is transferred via register to register transfers, a controller that is operatively connected to each processor controls the state of each processor, and a dedicated bus connected between the two processors transfers re-integration messages. The re-integration messages include data and address information and originate from the registers and memory.

In other aspects, the apparatus may include state machines for copying all writes directed to a specified memory of the first processor to a corresponding specified memory of the second processor, the state machines being responsive to a mode register in the first processor. A re-integration program that performs a read and a write-back to substantially every location in the specified memory is executed in the first processor and the first processor builds re-integration messages for transfer to the second processor.

According to another aspect of the present invention a method for re-integrating a first processor and at least one second processor in a fault tolerant system is provided in which the first and second processors each include registers and at least one memory. In a first phase of re-integration, the first processor is placed in a copy mode for copying information from a memory in the first processor to a memory in the second processor. A background program that performs a read and a write-back to substantially all locations in the memory in the first processor is executed. While in the copy mode and upon writing to the memory of the first processor, the same data is written to corresponding locations in the memory of the second processor. In a second phase, register contents and state information are copied from the first processor to the second processor by remote write addressing. Execution is halted and then is re-started in the first and second processors.

In other aspects, the method may enable at least one of the copy mode and the remote write operation by writing information to a special purpose register in the first processor.

BRIEF DESCRIPTION OF THE DRAWINGS

Applicant's invention will be understood by reading this description in conjunction with the drawings, in which.

DETAILED DESCRIPTION

This application describes the invention in the context of fault tolerant dual processor computer system which supports a telephone network. It will be understood that this is just an example and that the invention can be applied in many other contexts.

The present invention will be described in the context of being implemented in the APZ212-30 dual processor system manufactured by Ericsson Inc. However, it will be understood by those skilled in the art that the present invention could be implemented in any dual processor system, including systems with CPU's that have complex instruction sets (CISC) and reduced instruction sets (RISC). Also, the CPU's may be hardwired or microprogrammed.

A CPU in the APZ212-30 system is realized internally with an Instruction Processor Unit (IPU) for instruction execution and a Signal Processor Unit (SPU) for job administration. It should therefore be understood that when the SB CPU is described as being re-integrated that what is actually receiving the re-integration data is the IPU within the SB CPU. The stores (defined portions of main memory) which the IPU hold include a Data Store (DS), a Program Store (PS) and a Reference Store (RS). A reference store is specific to APZ and is used to hold linking information for supporting run-time linking of programs. Since a dual processor system may be thought of as a single entity, the two CPU's may sometimes be referred to as the EX side and the SB side. By extension, the two IPU's of a dual-processor system may also be referred to as the EX IPU side and the SB IPU side. However, it will be understood by those skilled in the art that each "side" is actually a separate CPU or IPU.

Figure 4:
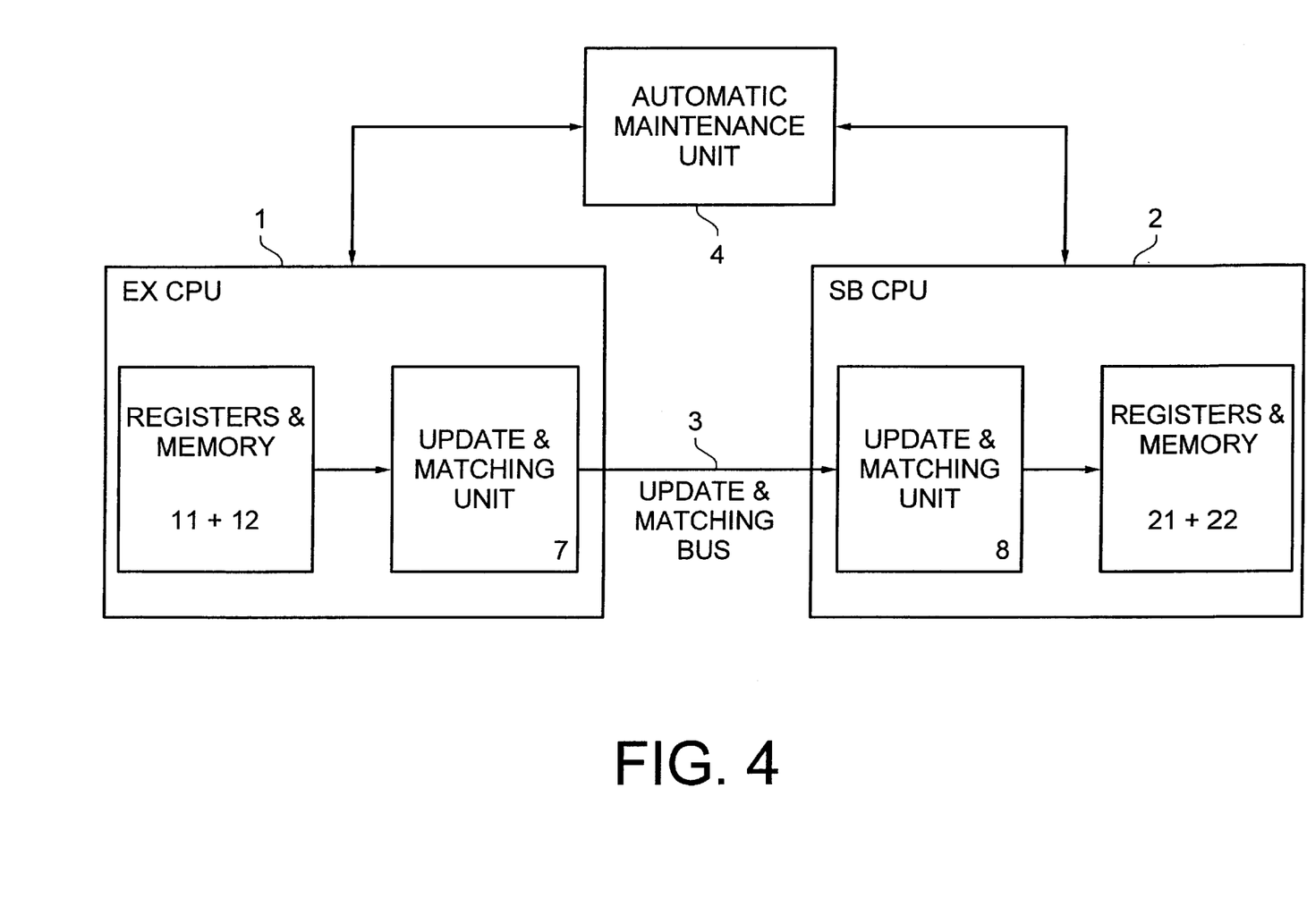
FIG. 4 is a block diagram illustrating a dual processor with Automatic Maintenance Unit.

FIG. 4 is a block diagram showing EX CPU 1 containing registers 11 and memory 12. SB CPU 2 contains registers 21 and memory 22. As mentioned above, the Data, Program and Reference Stores of each, EX CPU 1 and SB CPU 2, are contained within memories 12 and 22, respectively. Automatic Maintenance Unit (AMU) 4, which controls the states of the two processors, is connected to both CPU's 1 and 2. During re-integration, both CPU's are placed in an Update Mode by AMU 4. Further details of AMU 4 will be discussed later. Update and Matching Unit (UMU) 7, in CPU 1, is connected to UMU 8, in CPU 2, via Update and Matching Bus (UMB) 3. The UMU's, as the name implies, are involved in updating of a CPU side that has been halted or temporarily separated, i.e., for maintenance, and requires re-integration. UMU's 7 and 8 provide an interface between their respective IPU's and the UMB 3. Accordingly, a UMU may also be referred to as an IPU-UMB interface. Further features of the UMU (IPU-UMB interface) will be discussed later.

During normal operations the two CPU's work in a parallel operation mode. Execution results of the two processors are continuously compared by sending data on the Update and Matching Bus from the EX CPU to the SB CPU. The data is compared in the UMU 8 of the SB CPU for each clock-cycle in order to detect hardware faults. A clock-cycle difference of greater than zero is maintained between the two sides in order to compensate for wire delays. A difference of 12 clock cycles may be used for APZ212-30. In case of mismatch, the state of the two sides change, depending on which side the fault is located.

The invention will be discussed below using an example in which the SB CPU was found to contain an error or was temporarily separated from the system and thus requires re-integration. To relate this discussion to the prior art examples discussed above, the EX CPU will be the current processor and the SB CPU will be the faulty processor. It should be understood, however, that the present invention can be used to provide efficient updating of any CPU side in a redundant system of at least two processors.

In normal operation, the CPU's work in parallel and the results from both CPU's are the same, since they execute the same instruction stream and micro-instructions. After an intervention, causing one of the CPU's to be taken out of normal operations, the faulty CPU must be re-integrated with the data from the current CPU. An indication of the requirement for re-integration can be given in different ways. Detection hardware can automatically indicate when an occurrence requiring re-integration, such as insertion of a circuit board, has taken place. Re-integration could also be ordered by an operator, for example.

Re-integration is initiated by software in the EX CPU side by writing to a set of special purpose registers in the EX CPU. One of the special purpose registers is a mode register or flag. When this register is written to or set, the EX CPU is placed in a copy mode. In the copy mode, all memory writes performed in the EX CPU are automatically performed in the SB CPU as well. In other words, when data X is written to memory location Y in the EX CPU, data X is also automatically written to memory location Y in the SB CPU. The SB CPU remains in a passive state during the entire re-integration process. Keeping the SB CPU in a passive state allows the EX CPU to gain control of all hardware in the SB CPU and thereby have the ability to write to all registers and memory of the SB CPU without limitation.

Figure 5:
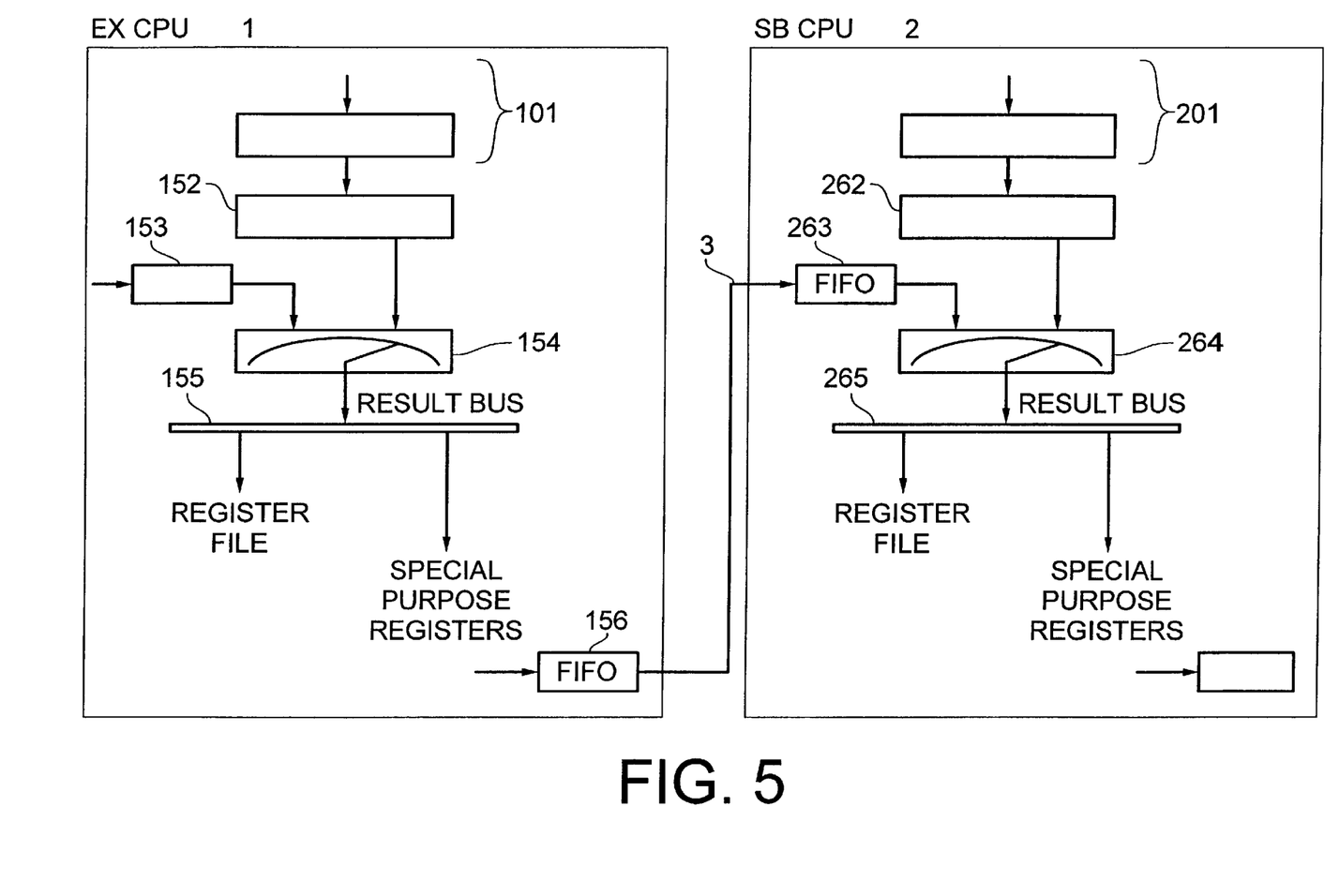
FIG. 5 illustrates the flow of updating data in accordance with one embodiment of the present invention.

FIG. 5 illustrates in greater detail a transfer of re-integration data from EX CPU 1 to SB CPU 2. Updating data is transferred from First In First Out (FIFO) register 156, in the EX CPU 1, to FIFO 263 in the SB CPU 2. FIFO's 156 and 263 are connected via UMB 3. Re-integration data is transferred from FIFO 263 through MUX 264 to result bus 265 and then to its final register or memory destination. MUX 264 is located between writeback unit 262 and results bus 265. During the entire re-integration process all transfers within SB CPU 2 are done under the control of the EX CPU 1 with SB CPU 2 remaining in a passive state. The "remote write" operation is initiated by software, a microprogram for example. Using software allows the logical interconnect to be simple and flexible, since it allows the hardware in a SB CPU 2, specifically the buses, to be controlled by the EX CPU 1 and assist in the re-integration process. Information which is transferred during re-integration includes the address of the register or memory that will be updated and the data with which it is to be updated.

Flow control is provided through the use of flow control update messages which are communicated between the EX CPU 1 and the SB CPU 2. These messages are provided through two flow control interconnections, within UMB 3, which may be referred to as "input" and "output". Input flow control prevents FIFO 263 in the receiving IPU from overflowing by sending a back pressure signal to the sending IPU. Output flow control prevents FIFO 156 in the transmitting end from overflowing by stalling the execution pipeline when necessary. The flow control interconnections are designed to be fail-safe, ensuring that an error in the standby side never causes the entire system to become deadlocked. The executive side uses a timeout mechanism to insure that a flow control signal from the standby side that tells the executive side to pause is only allowed to make the executive side pause for a predetermined amount of time. If the predetermined amount of time elapses, then the timeout mechanism can either cause a re-integration process to resume with indication of a timeout error or it can terminate the re-integration process, also indicating why re-integration was terminated.

Figure 6:
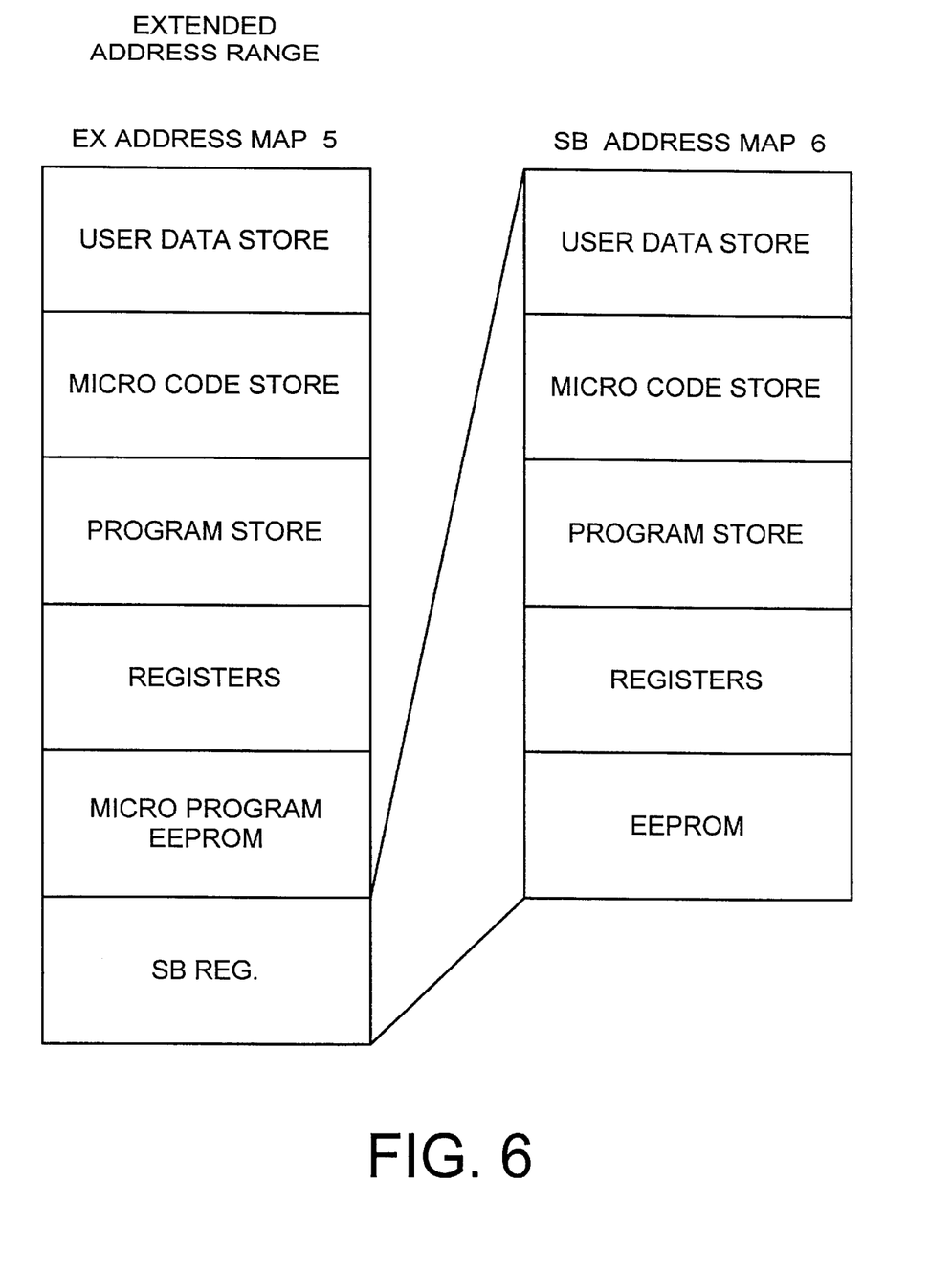
FIG. 6 illustrates the extended address range of the executive CPU in accordance with one aspect of the invention.

FIG. 6 illustrates the EX Address Map 5 which is available in the EX CPU 1. The addresses used in conjunction with the "remote write" operations during re-integration are supplied by the SB Reg of the EX Address Map. As shown in FIG. 6, all addresses found in the SB Address Map 6 are also found within the SB Reg portion of EX Address Map 5. When EX CPU 1 is in one of the two copy modes, all memory writes that execute are not only written in the EX CPU 1 but are also written in the SB CPU 2. The memory writes to SB CPU 2 are controlled by EX CPU 1 and the addresses used are supplied by the SB Reg. Addresses available to the EX CPU 1 during re-integration include those mapped to the user data store, microcode store, program store, registers and EEPROM of the SB CPU.

Figure 7:
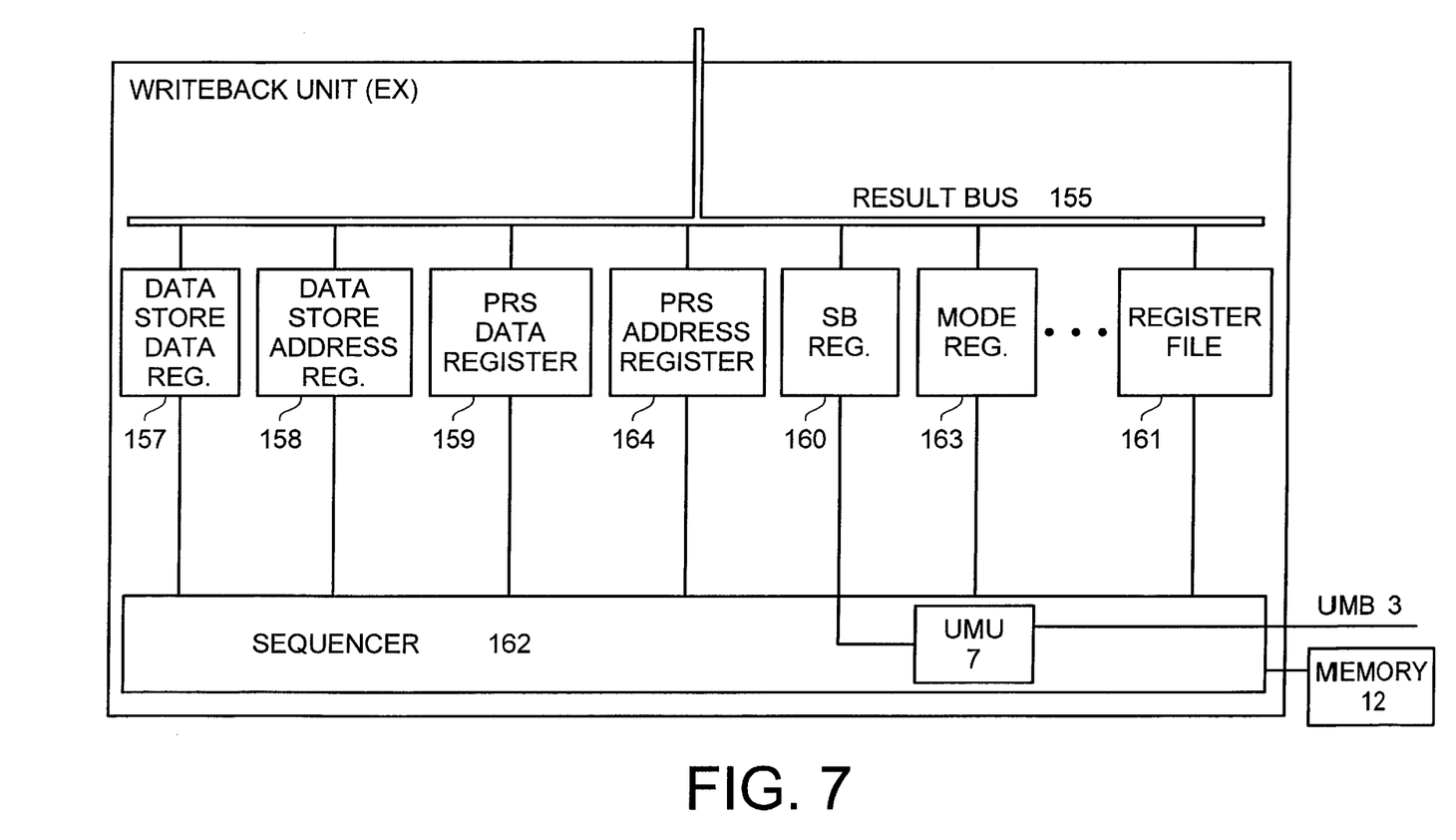
FIG. 7 is a detailed illustration of the writeback unit in the executive CPU according to one embodiment of the present invention.

FIG. 7 illustrates details of the Writeback Unit (EX) which is found in the EX CPU. Writeback Unit (EX) is the functional unit in the executive side which contains the hardware required to carry out the "remote write" operations of the present invention. In FIG. 7, results bus 155 transfers data to data registers 157, address registers 158, program and reference store (PRS) data registers 159, PRS address register 164, SB registers 160, mode register 163 and to register file 161. Sequencer 162 contains state machines, some of which react to input from mode register 163 when mode register 163 is placed in a copy mode. Two different copy modes which may be used include data store (DS) copy mode and PRS copy mode. Both modes change the function of sequencer 162. During routine operations, the sequencer 162 merely passes along results which are forwarded to the sequencer 162, via one of the registers 157–159, 164 or 161, from result bus 155. These routine results are then written to memory 12.

When mode register 163 indicates a copy mode, the sequencer 162 changes from merely doing routine operations to operating in a copy mode. In a copy mode, sequencer 162 automatically copies to memory 22 all writes to memory 12. The same writing to memory 12 that is done in routine operations is still carried out in the copy mode. There is simply an additional function of copying all writes to memory 22. In a copy mode, writes to memory 12 are carried out in the normal manner, with write results going directly from sequencer 162 to memory 12. Writes to memory 22 in the standby side are carried out, however, through the use of UMU 7 and UMB 3. In the DS copy mode, sequencer 162 receives data input from DS data register 157 and address input from DS address register 158. Sequencer 162 transfers this data and address information to UMU 7 for subsequent transfer over UMB 3 to the standby side. In the PRS copy mode, sequencer 162 receives data input from PRS data register 159 and address information from PRS address register 164. Sequencer 162 forwards this data and address information to UMU 7, which contains FIFO 156, for subsequent transfer over UMB 3 to the standby side.

The UMB 3 supports copying of the largest memories, specifically the DS, PS and RS. All of which are transferred under control of the IPU and UMU 7 of the EX CPU. The specific operations of the present invention supported by the UMB 3 are; Remote Writes, DS Write Copying, and PRS Write Copying. Remote Writes are used to copy register and control memory data to the SB CPU and are discussed in further detail below. DS Write Copying, as discussed above, allows all writes in the EX side DS to be automatically transferred to the DS in the SB side. PRS Write Copying, also discussed above, allows all writes to the program store (PS) and the reserve store (RS) in the EX side to be automatically transferred to the PS and RS in the SB side. As mentioned earlier, the DS, PS and RS are defined areas within the main memories of each CPU. However, it will be understood by those skilled in the art that separate memories could be used for each DS, PS and RS. In the example discussed below, the same memory is used to house all three stores. In other words, the DS, PS and RS of EX CPU 1 are contained in memory 12, and the DS, PS and RS of SB CPU 2 are contained in memory 22.

The re-integration process consists of several phases each associated with re-integrating a different data area in the receiving IPU. During all phases, up until synchronous restart of both CPU sides, the update process is controlled by the executive side. The standby side is passive, meaning all control is given to the EX CPU 1 and the SB CPU 2 is merely receiving data over the UMB 3. The update phases include:

1. Copy program and reference store (PRS)
2. Copy data store (DS)
3. Copy register memory (RM).
4. Synchronous start of the CP side.

Copying PRS information proceeds as follows. Mode register 163 is written to or set such that EX CPU 1 is placed in the Copy PRS mode. The "Copy PRS" mode enables a "Copy PRS writes" function of sequencer 162, which automatically copies all PRS writes which execute during the running of an application program in the EX CPU 1. The application program reads and writes back to the same PRS locations (memory 12) of the EX CPU 1. The writes trigger sequencer 162 to copy the same information to the standby side PRS (memory 22). Sequencer 162 is responsible for copying all PRS writes that execute to both memories 12 and 22. Besides explicitly copying all PRS writes which execute during the running of the application, a background program that reads every PRS memory locations in memory 12 is concurrently executed to ensure that all PRS information in EX CPU 1 is transferred to the PRS in SB CPU 2. This re-integration background program knows the beginning and ending addresses in memory 12 that define the PRS portions of memory 12. Beginning with the first address, the background program reads the data found there and then writes this data back to the same memory location the background program just read from. These writes trigger the sequencer 162 to copy the same data to the PRS portion of memory 22, via update messages which are sent over UMB 3.

Alternatively, in order to reduce the amount of required hardware in both the UMB 3 and the receiving CPU, the "Copy PRS" mode may map back to the "remote write" function. Under control of a microprogram, the PRS address register and PRS data register in the SB CPU 2 are written to and this writing is detected by hardware that causes the PRS information to be written to the PRS portion of memory 22.

Figure 8:
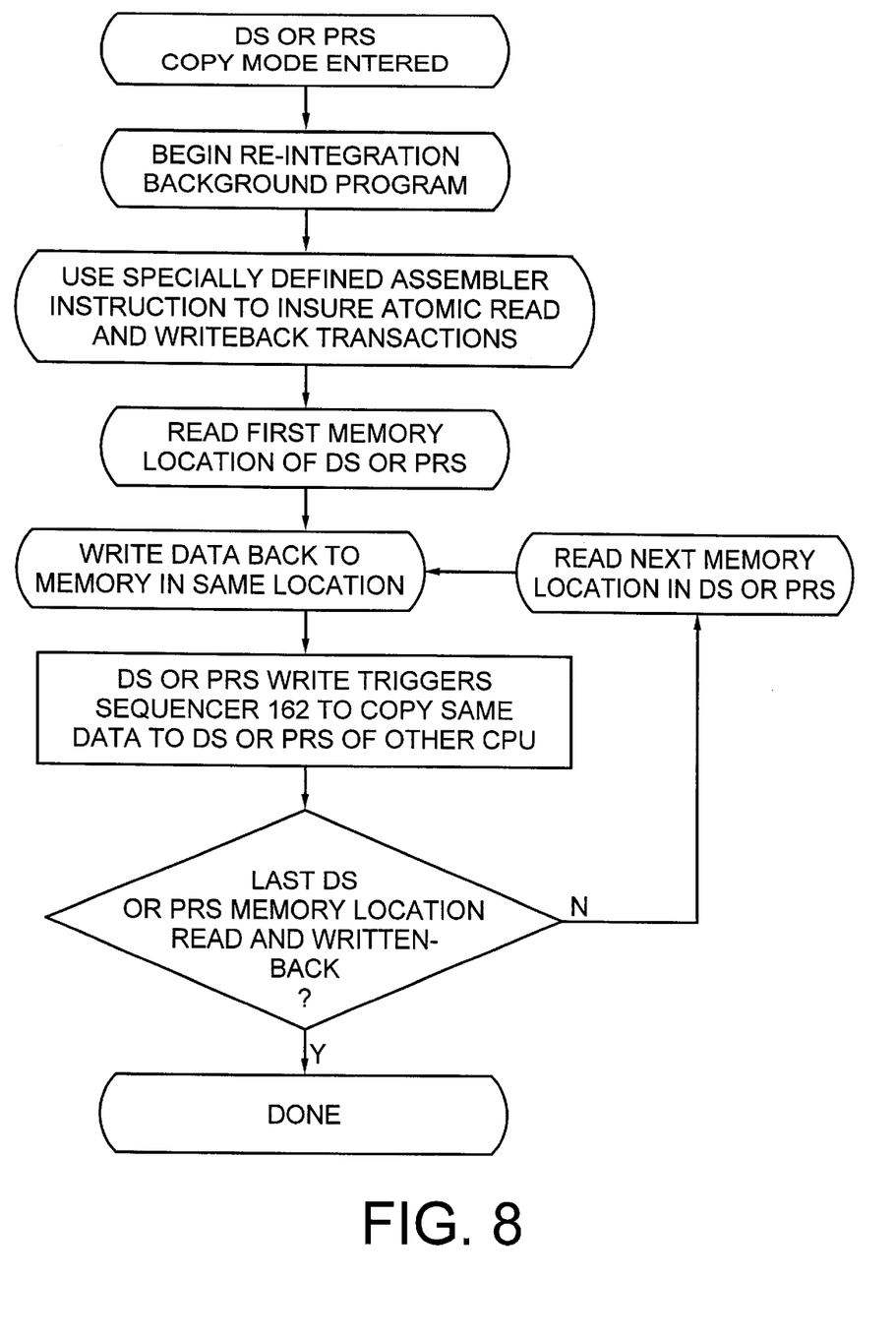
FIG. 8 is a flow chart of a program that executes in the background when the executive CPU is in a copy mode.

A flow chart of the background program executed during both copy modes is shown in FIG. 8. It will be understood by those skilled in the art that the flow chart of FIG. 8 can be used to illustrate the steps followed in both copy PRS and copy DS since each store is a defined portion of memory 12. It will also be understood that while every location in a specified memory may be read and written-back during the execution of the re-integration program, not every location needs to be read and written back. Only those memory locations that are actually used by the system need be read and written-back by the program.

The second phase of re-integration is copying the DS information. Again, the DS in the EX CPU 1 is a defined portion of memory 12 and the DS of SB CPU 2 is a defined portion of memory 22. Mode register 163 is written to or set such that EX CPU 1 is placed in the DS copy mode. This enables a "Copy DS writes" function of sequencer 162, the UMU 7 and the UMB 3. During execution of an application program, all DS writes to memory 12 are also automatically transferred and written to the standby side DS in memory 22 via sequencer 162. Just as in the PRS copy mode, a background program, which knows the beginning and ending addresses of the DS, is executed concurrently with the application program. This re-integration program that executes in the background reads every location in the DS portions of memory 12 and forces the data in each location to be written back to the same location in memory 12. This forced write, just as in the copy PRS mode, triggers sequencer 162 to transfer the same write data to an equivalent location in the DS portion of memory 22 in the SB side. This re-integration program ensures that all DS locations in memory 12 are transferred to the DS portions of memory 22. As mentioned above, FIG. 8 illustrates the steps followed by this background program.

It will be understood that the copy PRS writes function of sequencer 162 can be enabled during the time the DS copy function is enabled, thereby allowing PRS writes to be performed concurrently when required.

Copying of register memory is the final phase of the updating process. The copying of the register memory (RM) is enabled by writing into SB Reg 160. A microprogram routine then reads all locations in the RM of EX CPU 1 and writes to the corresponding registers in the standby side. A remote write address register and a remote write data register are two of the special purpose registers used for copying register memory. This portion of the updating process is executed as one atomic operation, which means that it is guaranteed to be performed as a continuous operation without interruption. This insures both processors will, upon restart, begin with the exact same internal state. Once the above phases of re-integration have been completed, the EX CPU 1 sends a message to the AMU 4 indicating that re-integration is complete. Both CPU's then wait for a parallel restart signal from AMU 4. Once the synchronous restart signal is received by both CPU's, all phases of re-integration have been completed and normal operations resume.

In a system like APZ212-30, synchronous restart is initiated by having the microprogram in the EX side send a signal to the AMU 4 that triggers the AMU 4 to generate a restart signal that is provided simultaneously to both CPU 1 and CPU 2. When the restart signal is received by both CPU's, the re-integration process is complete and both CPU's resume normal operations.

During re-integration, the two CPU's communicate with each other through update messages of at least three types: idle, register write and memory write. For systems that use more than one memory, such as APZ212-30, there may be a type of message associated with each memory. The messages contain re-integration data, address and a type tag that lets the UMU's (IPU-UMB interface) 7 and 8 of each processor know what type of transfer is taking place or if an UMU is idle. A re-integration protocol is followed during construction of the re-integration messages so that the UMU 8 will recognize the type tag on each message and forward the data to the appropriate location. Any protocol can be followed provided the same protocol is followed by each processor. Register write type messages will be placed on the result bus 265 of the SB CPU 2. Memory write type messages will be transferred to memory 22 of SB CPU 2. Idle messages take one clock cycle to transfer on the UMB 3. Register write and memory write messages involve the transfer of two words, address and data. These two messages may therefore take two clock cycles each.

Special care must be taken in regard to any real time clock counter that might be used by the CPU's. The counter must be read and stopped in both the executive and the standby side and then written back with the same value in both sides. The clock counter will then remain stopped until the synchronous restart is performed upon completion of the final phase of updating. Calendar time, which may be lost when the clock counter is stopped, can be appropriately updated once normal operations have resumed.

Figure 9:
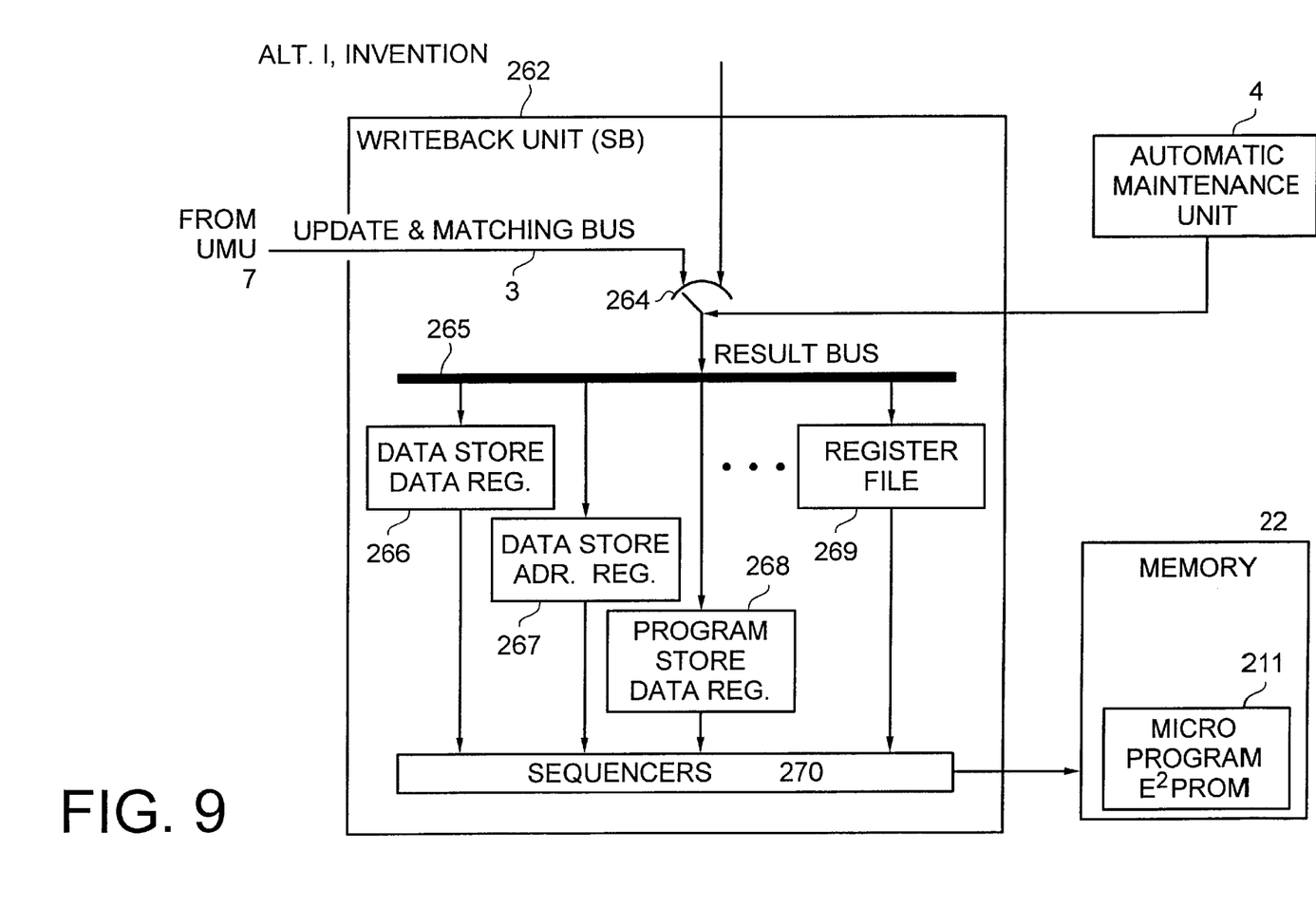
FIG. 9 is a detailed illustration of the writeback unit in the stand by CPU according to one embodiment of the present invention.

FIG. 9 illustrates the relation of UMB 3 and SB CPU 2. UMB 3 receives input from UMU 7 shown in FIG. 7. The output of UMB 3, shown in FIG. 9, is provided as input to MUX 264 which is within writeback unit 262 of SB CPU 2. MUX 264 is the recipient of register write messages during re-integration. MUX 264 is controlled by AMU 4 and provides control of the register write buses and the memory write buses in SB CPU 2. In FIG. 9 re-integration addresses and data are injected directly on result bus 265. This allows access to the special purpose registers of the SB CPU 2, which in turn allows unrestricted access to the rest of SB CPU 2 without limitation.

Figure 10:
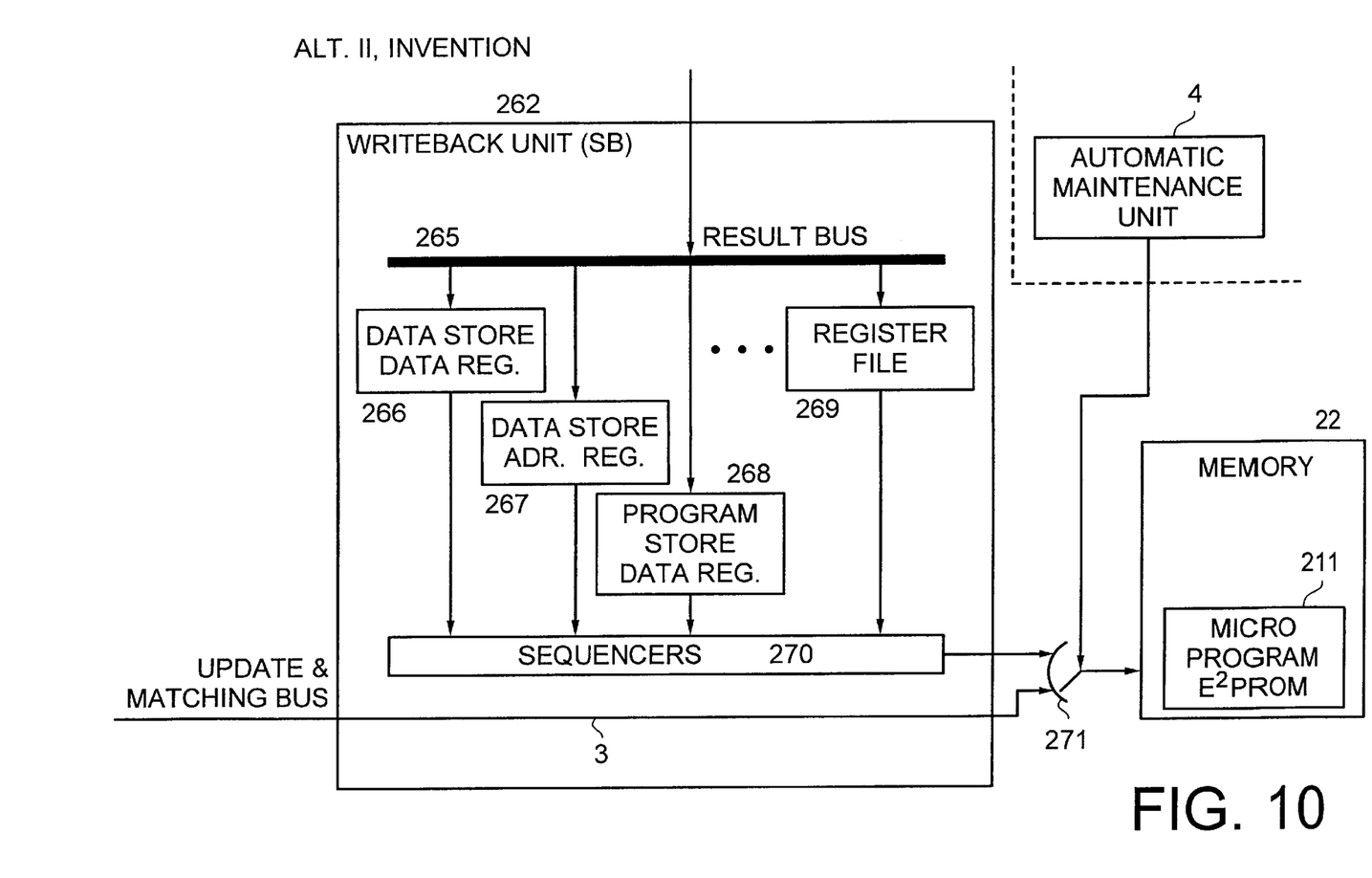
FIG. 10 is a detailed illustration of the stand by CPU in accordance with one embodiment of the present invention.

FIG. 10 illustrates a second MUX 271, which could be used in conjunction with MUX 264 of FIG. 9. MUX 271 of FIG. 10 would receive memory write messages during re-integration and output the data to a memory write queue in memory 22. The use of MUX 271 may prove beneficial by bypassing the writeback unit 262. MUX 271 only provides access to memory 22. Therefore, if used without MUX 264, MUX 271 would only provide support in copying DS and PRS. The system would need MUX 264 to access all registers.

The "remote write" mechanism of the present invention provides software control, in the EX CPU, over what is copied and when. This is important, especially in regards to updating of the CPU state, since this mechanism avoids copying data that will be written over later. This efficient transfer of data allows for a streamline design by decreasing the required bandwidth of the UMB.

Giving the EX CPU 1 total control over the SB CPU 2 busses gives the EX side full control over the SB side without limitation. The EX side can update all parts of the SB side using the same mechanisms used when updating its own logic. Control of the update function is done directly by hardware in the SB CPU 2 side without any software involved. This makes it possible to control the SB side without a working program in EEPROM 211.

The executive side may have the ability to copy the contents of its control memory (CM) into the CM of the standby side during re-integration. This function is carried out through the use of CM write registers in the SB side, which are some of the special purpose registers mentioned earlier. These registers comprise CM data registers and CM address registers. During re-integration, the EX CPU 1 uses addresses from SB Reg 160 to write address information into a CM address register in the SB side. The EX CPU 1 also writes data from its own CM, or a new microprogram, into a CM data register in the SB side. Writing into the CM data register triggers hardware in sequencer 270 to transfer this information to the addressed location in the CM of SB CPU 2. Copying of the microprogram, or other contents of the EX CPU's PROM, to the SB CPU 2 is possible because the addresses in SB Reg 160 are mapped to all memory locations in the SB CPU 2.

In the event a new microprogram must be loaded into the EX CPU 1, and the EX CPU 1 is not the faulty CPU, a set of CM data and address registers in the EX side are used. In this case, EX CPU 1 writes the new control data in the EX side CM data register. Writing into this data register triggers the loading of the new microprogram in the CM of EX CPU 1. So each CPU may be loaded with a new microprogram during re-integration. This will allow maximum flexibility out of the CPU's used in the system.

Figure 11:
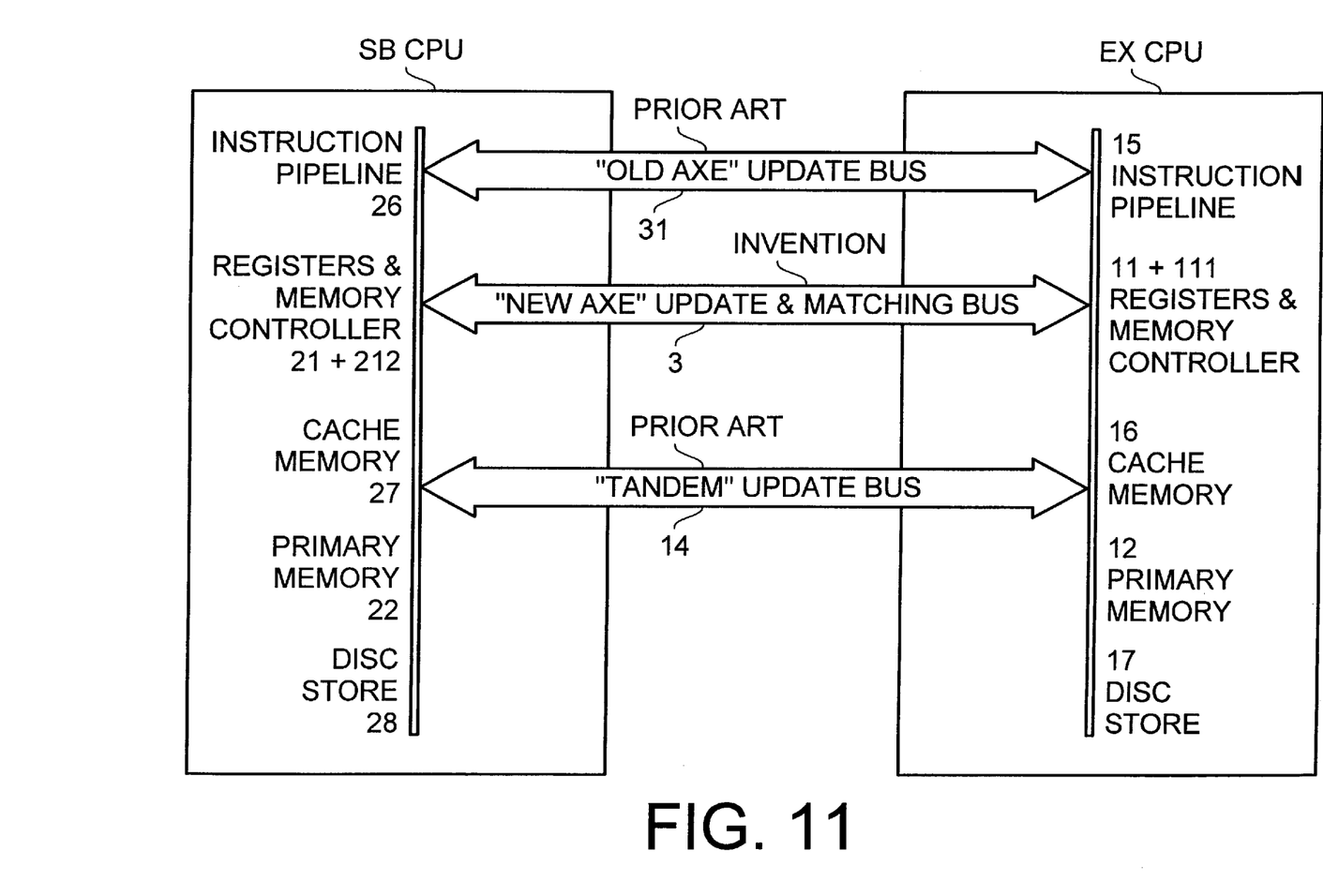
FIG. 11 is a block diagram contrasting one aspect of the present invention with the prior art.

FIG. 11 illustrates generalized connection points for an exemplary embodiment of the present invention and two prior art update systems. The main connection points of the illustrated embodiment of the present invention are between the registers and the memory controllers of the two CPU's. Such a connection scheme integrates the benefits of fast register to register transfers with those of total control of one CPU by another CPU. The present connection scheme can be contrasted in FIG. 11 with prior art connection schemes which either intimately involves slower main memory, as in the copy main memory method illustrated by interconnect 14, or involve the transfer of large amounts of needless information, such as in the copy instruction execution results method illustrated by interconnect 31.

An advantage to keeping the standby side in the passive state during re-integration is the required bandwidth of UMB 3 can be kept low. Given the high performance of modem CPU's, the internal state will change rapidly. Most of these state changes are for data in registers that are changed within a few clock cycles. It is not efficient to transfer most of this state related data. Since the standby side remains passive it is possible to transfer the EX CPU 2 state once, at the end of the update process instead of keeping it continuously updated. Also, transfer is done directly from registers without requiring any memory writes or reads. By not involving main memory, which has a slower access time than registers, the speed at which updating is performed is increased and "down time" for the system is reduced. An overall benefit of using this implementation with the message packages and passive standby side is increased speed and decreased update time.

It will be appreciated by those of ordinary skill in the art that this invention can be embodied in other specific forms without departing from its essential character. For example, the "remote writes" could be initiated through the use of special instructions, instead of writing to registers. Also, initiating "remote writes" could be done by writing to memory mapped or I/O mapped registers, instead of writing to special purpose registers. The embodiments described above should therefore be considered in all respects to be illustrative and not restrictive.

What is claimed is:

1. A method of re-integrating a first processor and at least one second processor in a fault tolerant system, the first and second processors each including registers and at least one memory, comprising the steps of:

detecting a requirement for re-integration;

in the first processor, enabling at least one of a copy mode and a remote write operation for a transfer of re-integration information; and transferring re-integration information from the first processor to the second processor via messages;

wherein the transferring step has a plurality of phases, the phases including at least one phase for transferring register information directly from the first processor to the second processor and at least one phase for transferring memory information, and the re-integration information originates from at least one of the registers and memory.

2. The method of claim 1, wherein a controller controls the state of the first and the second processor;

all phases of re-integration are controlled by software in the first processor; and each re-integration message includes a type tag that indicates a type of data being transferred.

3. A method of re-integrating a first processor and at least one second processor in a fault tolerant system, the first and second processors each including registers and at least one memory, comprising the steps of:

detecting a requirement for re-integration;

in the first processor, enabling at least one of a copy mode and a remote write operation for a transfer of re-integration information;

transferring re-integration information from the first processor to the second processor via messages, wherein the step of transferring re-integration information includes the step of accessing, in the first processor, an address mapping of all registers and memory locations in the second processor; and wherein the transferring step has a plurality of phases, the phases including at least one phase for transferring register information and at least one phase for transferring memory information, and the re-integration information originates from at least one of the registers and memory.

4. The method of claim 3, wherein the step of transferring re-integration information further comprises the step of performing flow control of re-integration messages in an interface in each of the first and second processors.

5. The method of claim 3, wherein the step of enabling at least one of a copy mode and a remote write operation comprises the steps of:

writing to a mode register in order to place the first processor in a copy memory writes mode; and changing in the first processor the operation of a sequencer so that the sequencer copies all writes to a specified memory in the first processor to a corresponding specified memory in the second processor, after the mode register is written to.

6. The method of claim 5, wherein the step of transferring re-integration information further comprises the steps of:

specifying the memory in each processor as a data store memory;

executing a re-integration program that performs a read and a write-back to substantially every data store memory location in the first processor;

building re-integration messages in the first processor; and transferring the re-integration messages to a data store memory in the second processor.

7. The method of claim 5, wherein the step of transferring re-integration information further comprises the steps of:

specifying the memory in each processor as a program store;

executing a re-integration program that performs a read and a write-back to substantially every program store memory location in the first processor; and building re-integration messages in the first processor at least in part from information provided in a program data register and a program address register.

8. The method of claim 3, wherein the step of transferring re-integration information further comprises the steps of:

using the remote write operation to transfer re-integration information to the second processor; and allowing the first processor to write to any register in the second processor without writing to a corresponding register in the first processor.

9. The method of claim 8, wherein register information in the first processor is transferred through a remote write address register and a remote write data register in the first processor.

10. The method of claim 8, wherein information in a control memory in the first processor is transferred through a control memory address register and at least one control memory data register in the second processor.

11. The method of claim 3, wherein re-integration information is transferred via at least one first-in-first-out register in the first processor and at least one first-in-first-out register in the second processor, and each re-integration message includes a type tag that indicates a type of data being transferred.

12. An apparatus for re-integrating a first processor and at least one second processor in a fault tolerant processor system, the first and second processors each having registers and at least one memory, comprising:

a detector in the first processor that initiates re-integration upon detection that re-integration is required;

at least one register in the first processor for transferring re-integration information directly to at least one register of the second processor;

a controller for controlling a state of each processor; and a dedicated bus for transferring re-integration messages from the first processor to the second processor, wherein each re-integration message includes data and address information and the re-integration messages originate from at least one of the registers and memory.

13. The apparatus of claim 12, wherein the controller is operatively connected to each of the first and second processors.

14. The apparatus of claim 12, further comprising state machines for copying all writes to a specified memory of the first processor to a corresponding specified memory of the second processor, wherein the state machines are responsive to a mode register in the first processor.

15. The apparatus of claim 14, wherein the specified memory in each processor is a data store memory; a re-integration program that performs a read and a write-back to substantially every data store memory location is executed in the first processor; and the first processor builds re-integration messages and transfers the re-integration messages to the data store memory in the second processor.

16. The apparatus of claim 14, wherein the specified memory in each processor is a program store memory; a re-integration program that performs a read and a write-back to substantially every program store memory location is executed in the first processor; and the first processor builds re-integration messages at least in part from information provided in a program data register and a program address register.

17. An apparatus for re-integrating a first processor and at least one second processor in a fault tolerant processor system, the first and second processors each having registers and at least one memory, comprising:

a detector in the first processor that initiates re-integration upon detection that re-integration is required;

at least one register in the first processor for transferring re-integration information directly to at least one register of the second processor;

a controller for controlling a state of each processor;

a dedicated bus for transferring re-integration messages from the first processor to the second processor, wherein each re-integration message includes data and address information and the re-integration messages originate from at least one of the registers and memory; and means for performing a remote write operation, wherein the remote write operation enables the first processor to write to any register in the second processor without writing to a corresponding register in the first processor.

18. The apparatus of claim 17, wherein information in a register memory in the first processor is transferred through a remote write address register and a remote write data register in the first processor.

19. The apparatus of claim 17, wherein information in a control memory in the first processor is transferred through a control memory address register and at least one control memory data register in the second processor.

20. An apparatus for re-integrating a first processor and at least one second processor in a fault tolerant processor system, the first and second processors each having registers and at least one memory, comprising:

a detector in the first processor that initiates re-integration upon detection that re-integration is required;

at least one register in the first processor for transferring re-integration information directly to at least one register of the second processor;

a controller for controlling a state of each processor;

a dedicated bus for transferring re-integration messages from the first processor to the second processor, wherein each re-integration message includes data and address information and the re-integration messages originate from at least one of the registers and memory; and an interface in each processor that controls a flow of the re-integration messages, wherein the re-integration messages include a type tag that indicates a type of data being transferred.

21. The apparatus of claim 20, wherein the type tag indicates one of a memory write, a register write and an idle condition.

22. A method of re-integrating a first processor and at least one second processor in a fault tolerant system, the first and second processors each including registers and at least one memory, comprising the steps of:

in a first phase, placing the first processor in a copy mode for copying information from a memory of the first processor to a memory of the second processor;

executing a background program in the first processor that performs a read and a write-back to substantially all locations in the memory in the first processor;

the first processor, while in the copy mode and upon writing to locations in the memory of the first processor, writing to corresponding locations in the memory of the second processor;

in a second phase, copying register contents and state information directly from the first processor to the second processor by remote write addressing;

halting execution by the first and second processors; and then substantially simultaneously re-starting execution by the first and second processors.

23. The method of claim 22, wherein register contents and state information in the first processor is copied through a remote write address register and a remote write data register in the first processor.

24. A method of re-integrating a first processor and at least one second processor in a fault tolerant system, the first and second processors each including registers and at least one memory, comprising the steps of:

in a first phase, placing the first processor in a copy mode for copying information from a memory of the first processor to a memory of the second processor;

executing a background program in the first processor that performs a read and a write-back to substantially all locations in the memory in the first processor;

the first processor, while in the copy mode and upon writing to locations in the memory of the first processor, writing to corresponding locations in the memory of the second processor;

while the first processor is in the copy mode and when information is written to a location in the memory of the first processor, sending to the second processor at least one message of a first type that indicates that the same information is to be written into a corresponding location in the memory of the second processor;

in a second phase, copying register contents and state information from the first processor to the second processor by remote write addressing;

in the second phase, sending to the second processor at least one message of a second type indicating a remote write operation by which register contents and state information is written directly to corresponding registers holding state information in the second processor;

halting execution by the first and second processors; and then substantially simultaneously re-starting execution by the first and second processors.

25. The method of claim 24, wherein at least one of the copy mode and the remote write operation is enabled by writing information to a special purpose register in the first processor.

* * * * *